(12) United States Patent
Zhu et al.

(10) Patent No.: US 7,085,083 B2
(45) Date of Patent: Aug. 1, 2006

(54) METHOD FOR TESTING A MICRO-ACTUATOR IN A MAGNETIC TESTER

(75) Inventors: Li-Yan Zhu, San Jose, CA (US); Chao-Hui Yang, Milpitas, CA (US); Xiaofeng Zhang, Fremont, CA (US); Yen Fu, San Jose, CA (US); Ellis T. Cha, San Ramon, CA (US)

(73) Assignee: SAE Magnetics (H.K.) Ltd., Shatin (HK)

( * ) Notice: Subject to any disclaimer, the term of this patent is extended or adjusted under 35 U.S.C. 154(b) by 172 days.

(21) Appl. No.: 10/728,450

(22) Filed: Dec. 5, 2003

(65) Prior Publication Data

US 2005/0122607 A1  Jun. 9, 2005

(51) Int. Cl.
   *G11B 27/36* (2006.01)
(52) U.S. Cl. .......................................... 360/31; 360/75
(58) Field of Classification Search ................ 360/31
   See application file for complete search history.

(56) References Cited

U.S. PATENT DOCUMENTS 6,801,377 B1 *  10/2004  Kasajima et al. .......... 360/31
2003/0103284 A1 *  6/2003  Cheng et al. ............. 360/31

* cited by examiner

*Primary Examiner*—Andrea Wellington
*Assistant Examiner*—Dan I Davidson
(74) *Attorney, Agent, or Firm*—Kenyon & Kenyon LLP

(57) ABSTRACT

A system and method for testing the stroke and frequency response of a micro-actuator is disclosed. A dynamic parameter tester writes two concentric tracks on a noise free portion of a magnetic storage medium. A magnetic read/write head and a micro-actuator is positioned between the two concentric tracks. An initial oscillating voltage is applied at a first frequency to the micro-actuator while reading back a signal from the two concentric tracks. A stroke characteristic of the micro-actuator is calculated based in part on the read-back signal. The initial oscillating voltage is determined from previous tests. The first stroke characteristic of the micro-actuator is based on a time-averaged amplitude of the first signal. The two concentric tracks are written at a pre-determined pitch.

22 Claims, 9 Drawing Sheets

US 7,085,083 B2

METHOD FOR TESTING A MICRO-ACTUATOR IN A MAGNETIC TESTER

BACKGROUND INFORMATION

The present invention relates to magnetic hard disk drives. More specifically, the present invention relates to a method of testing the stroke and the frequency response of a micro-actuator used in a hard disk drive.

Hard disk drives are common information storage devices essentially consisting of a series of rotatable disks, or other magnetic storage mediums, that are accessed by magnetic reading and writing elements. These data transferring elements, commonly known as transducers, are typically carried by and embedded in a slider body that is held in a close relative position over discrete data tracks formed on a disk to permit a read or write operation to be carried out. In order to properly position the transducer with respect to the disk surface, an air bearing surface (ABS) formed on the slider body experiences a fluid air flow that provides sufficient lift force to "fly" the slider and transducer above the disk data tracks. The high speed rotation of a magnetic disk generates a stream of air flow or wind along its surface in a direction substantially parallel to the tangential velocity of the disk. The air flow cooperates with the ABS of the slider body which enables the slider to fly above the spinning disk. In effect, the suspended slider is physically separated from the disk surface through this self-actuating air bearing.

Some of the major objectives in ABS designs are to fly the slider and its accompanying transducer as close as possible to the surface of the rotating disk, and to uniformly maintain that constant close distance regardless of variable flying conditions. The height or separation gap between the air bearing slider and the spinning magnetic disk is commonly defined as the flying height. In general, the mounted transducer or read/write element flies only approximately a few micro-inches above the surface of the rotating disk. The flying height of the slider is viewed as one of the most critical parameters affecting the magnetic disk reading and recording capabilities of a mounted read/write element. A relatively small flying height allows the transducer to achieve greater resolution between different data bit locations on the disk surface, thus improving data density and storage capacity. With the increasing popularity of lightweight and compact notebook type computers that utilize relatively small yet powerful disk drives, the need for a progressively lower flying height has continually grown.

FIG. 1 illustrates a hard disk drive design typical in the art. Hard disk drives 100 are common information storage devices consisting essentially of a series of rotatable disks 104 that are accessed by magnetic reading and writing elements. These data transferring elements, commonly known as transducers, are typically carried by and embedded in a slider body 110 that is held in a close relative position over discrete data tracks formed on a disk to permit a read or write operation to be carried out. The slider is held above the disks by a suspension. The suspension has a load beam and flexure allowing for movement in a direction perpendicular to the disk. The suspension is rotated around a pivot by a voice coil motor to provide coarse position adjustments. A micro-actuator couples the slider to the end of the suspension and allows fine position adjustments to be made.

In order to properly position the transducer with respect to the disk surface, an air bearing surface (ABS) formed on the slider body 110 experiences a fluid air flow that provides sufficient lift force to "fly" the slider 110 (and transducer) above the disk data tracks. The high speed rotation of a magnetic disk 104 generates a stream of air flow or wind along its surface in a direction substantially parallel to the tangential velocity of the disk. The airflow cooperates with the ABS of the slider body 110 which enables the slider to fly above the spinning disk. In effect, the suspended slider 110 is physically separated from the disk surface 104 through this self-actuating air bearing. The ABS of a slider 110 is generally configured on the slider surface facing the rotating disk 104, and greatly influences its ability to fly over the disk under various conditions. To control the in-plane motion of the slider, especially to access various data tracks on the disk surface, the head suspension assembly (HSA) typically incorporates a primary actuator. The primary actuator may be a voice coil located at the end opposite the read/write head. Due to the large inertia of the HSA, the primary actuator has limited bandwidth. Vibration of the suspension makes it difficult to control the read/write head position from a distance. The primary actuator along has difficulty achieving the speed and accuracy of position required.

Advanced disk drive design incorporates a secondary actuator, or micro-actuator, between the read/write head and the pivotal axis of the HSA. The stroke, or distance of displacement in relation to the voltage applied, of these micro-actuators is typically in the order of 1 μm. FIG. 2a illustrates a micro-actuator with a U-shaped ceramic frame configuration 201. The frame 201 is made of, for example, Zirconia. The frame 201 has two arms 202 opposite a base 203. A slider 204 is held by the two arms 202 at the end opposite the base 203. A strip of piezoelectric material 205 is attached to each arm 202. A bonding pad 206 allows the slider 204 to be electronically connected to a controller. FIG. 2b illustrates the micro-actuator as attached to an actuator suspension flexure 207 and load beam 208. The micro-actuator can be coupled to a suspension tongue 209. Traces 210, coupled along the suspension flexure 207, connect the strips of piezoelectric material 205 to a set of connection pads 211. Voltages applied to the connection pads 211 cause the strips 205 to contract and expand, moving the placement of the slider 204. The suspension flexure 207 can be attached to a base plate 212 with a hole 213 for mounting on a pivot via a suspension hinge 214. A tooling hole 215 facilitates handling of the suspension during manufacture and a suspension hole 216 lightens the weight of the suspension.

The read/write head is routinely tested before shipment. Typically a read/write head is flown over a spinning disk connected to a dynamic parametric (DP) tester, and a sequence of read/write activity is performed. A DP test may be conducted when the read/write head is assembled in either a head gimbal assembly (HGA), a HSA, or a head-disk assembly.

The DP test may include testing the stroke of the micro-actuator at various input voltages. One method for testing the stroke is shown in FIG. 3. The quasi-static stroke may be measured by writing a first concentric track 310 and a second concentric track 320 at distinct constant input voltages and then obtaining a "track profile" over the above tracks by reading at successively increasing or decreasing radii. The track profile may compare the radial position of the read head 330 with the read back signal 340. The input voltages may be no input, maximum input, or negative maximum input. Each peak of the track profile indicates a center of a track. The stroke may be calculated using the distance 350 between the adjacent peaks.

The DP test may also include testing for frequency response. The frequency response compares the stroke to the input frequency. As shown in FIG. 4, the frequency response may be measured by, at each input frequency, first erasing a band of disk surfaces, then applying a predetermined alternating input voltage at a desired frequency while writing over this erased band for approximately one revolution of the disk. After removing the input voltage, map the written signal by reading at successively increasing, or decreasing radii, while recording the amplitude of the read-back signal as a function of both radius and angular position. A sinusoidal curve 410 is mathematically fit to the track readings which represents locations with peak amplitude of the read-back signal for each track. The amplitude 420 of this sinusoidal curve is the stroke at the given frequency.

These methods are slow. For each desired frequency the disk surface must be erased and re-written. At each frequency the amount of data required to map the written signal is also large, because the map of FIG. 4 is two-dimensional instead of one-dimensional. Other methods for measuring micro-actuator frequency response include optical and electrical tests. In the optical test, a laser beam is directed at the read/write head or its vicinity. The reflected light is collected and analyzed for the velocity or displacement of the reflecting surface. This method requires expensive equipment and delicate alignment. The electrical test is possible for micro-actuators with more than one active element. The input voltage is applied on some but not all of the elements. Those elements not receiving the input voltage are driven mechanically by other elements, thus generating a small output voltage from which stroke may be derived. However, this mode of excitation differs from the mode in application, in which all elements receive input voltage. Thus the frequency response pertains to a vibration mode other than the mode of actual concern. Furthermore, when an HSA has multiple read/write heads, accessing only the head of interest without interference of the other heads may become difficult.

DETAILED DESCRIPTION

A system and method for testing the stroke and frequency response of a micro-actuator is disclosed. In one embodiment, a dynamic parameter tester may write two concentric tracks on a noise free portion of a magnetic storage medium. A magnetic read/write head and a micro-actuator may be positioned between the two concentric tracks. An initial oscillating voltage may be applied at a first frequency to the micro-actuator while reading back a signal from the two concentric tracks. A stroke characteristic of the micro-actuator may be calculated based in part on the read-back signal. The initial oscillating voltage may be determined from previous tests. The first stroke characteristic of the micro-actuator may be based on a time-averaged amplitude of the first signal. The two concentric tracks may be written at a pre-determined pitch.

Figure 1:
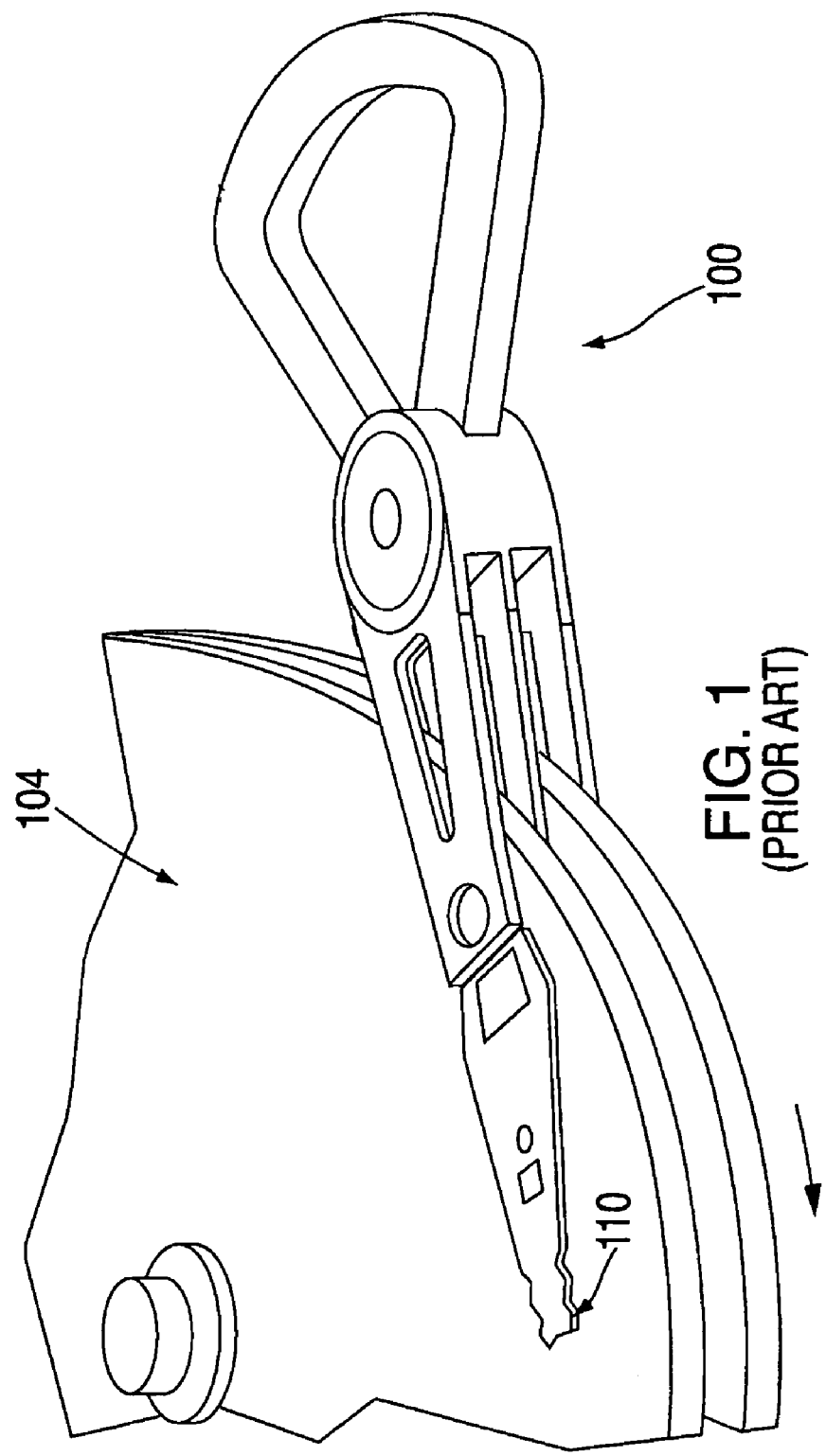
FIG. 1 illustrates a hard disk drive design that is known in the art.
Figures 2A, 2B:
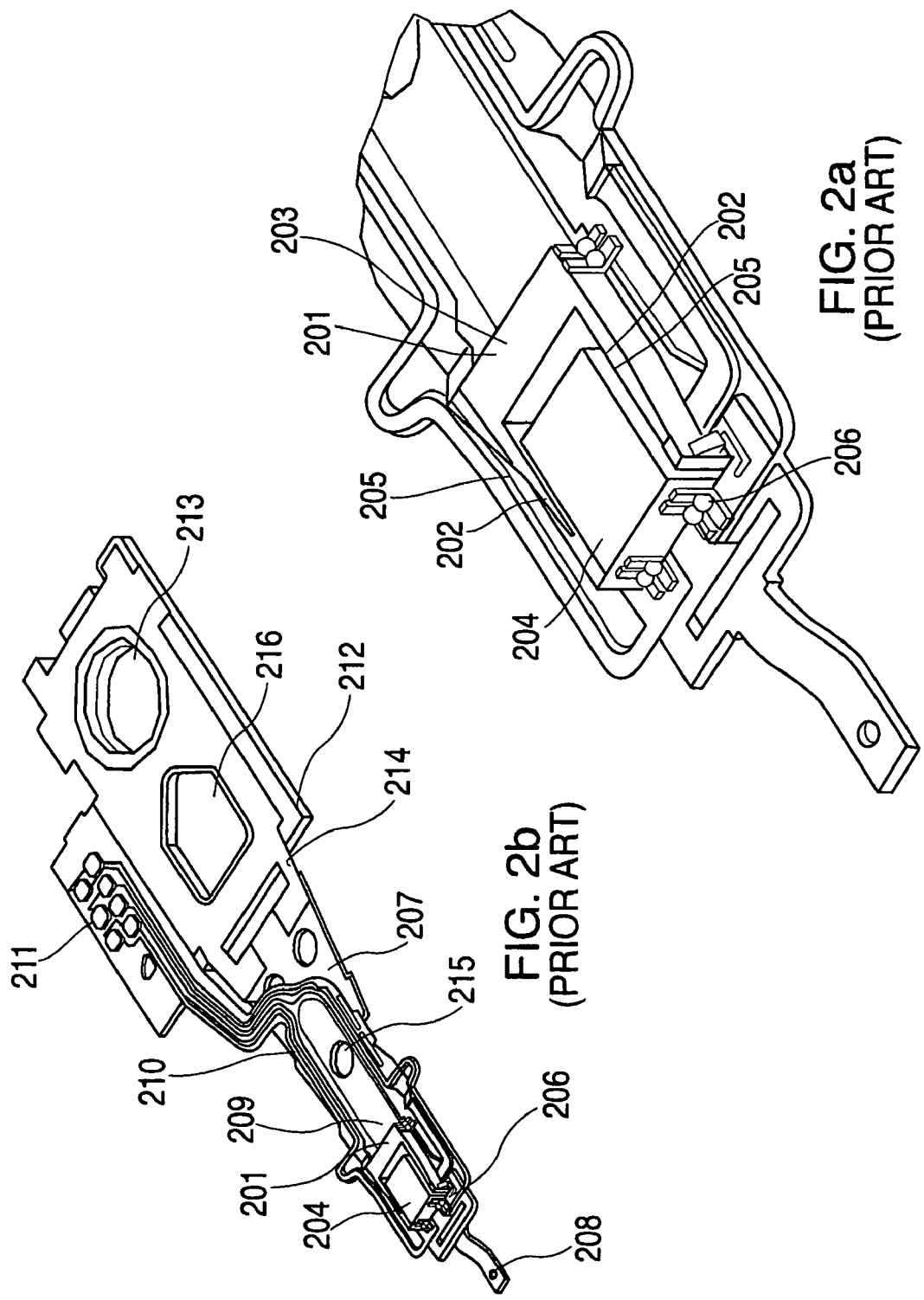
FIGS. 2a–b illustrate a micro-actuator as attached to an actuator suspension flexure and load beam as known in the art.
Figure 3:
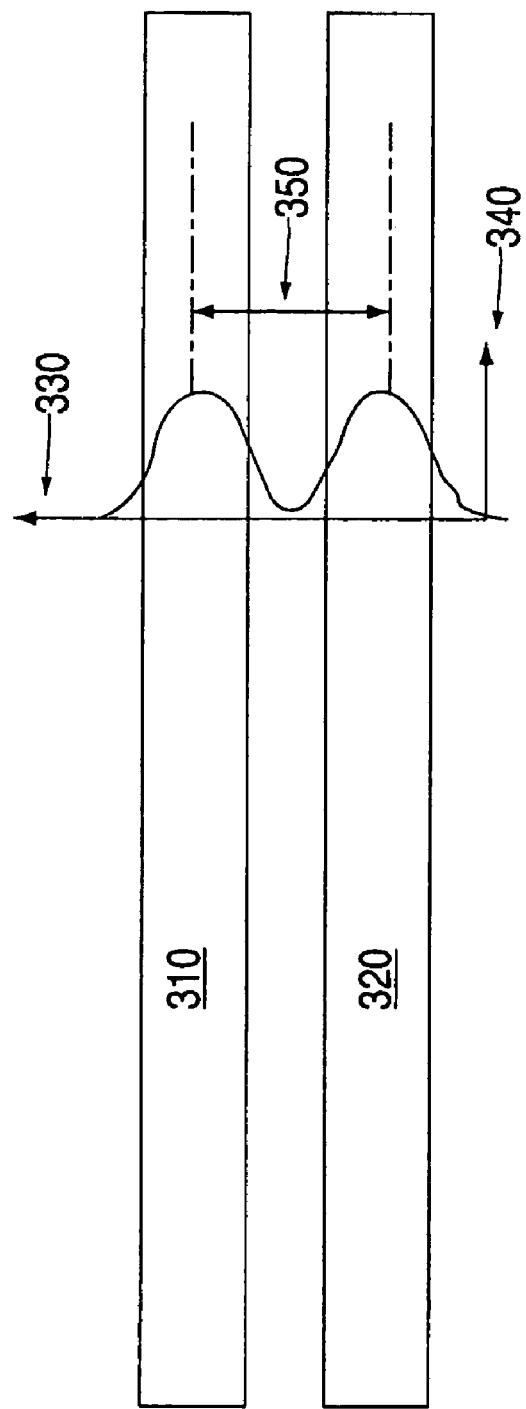
FIG. 3 illustrates one embodiment of the results of a method for testing stroke.
Figure 4:
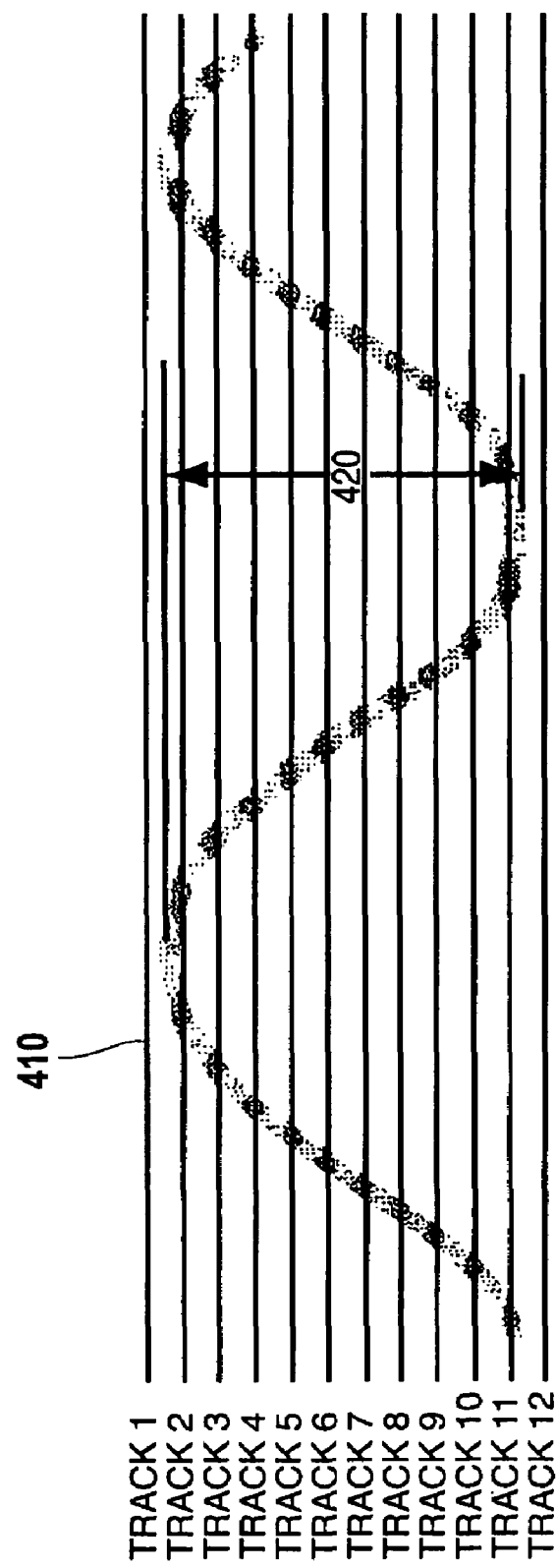
FIG. 4 illustrates one embodiment of the results of a method for testing frequency response.
Figure 5:
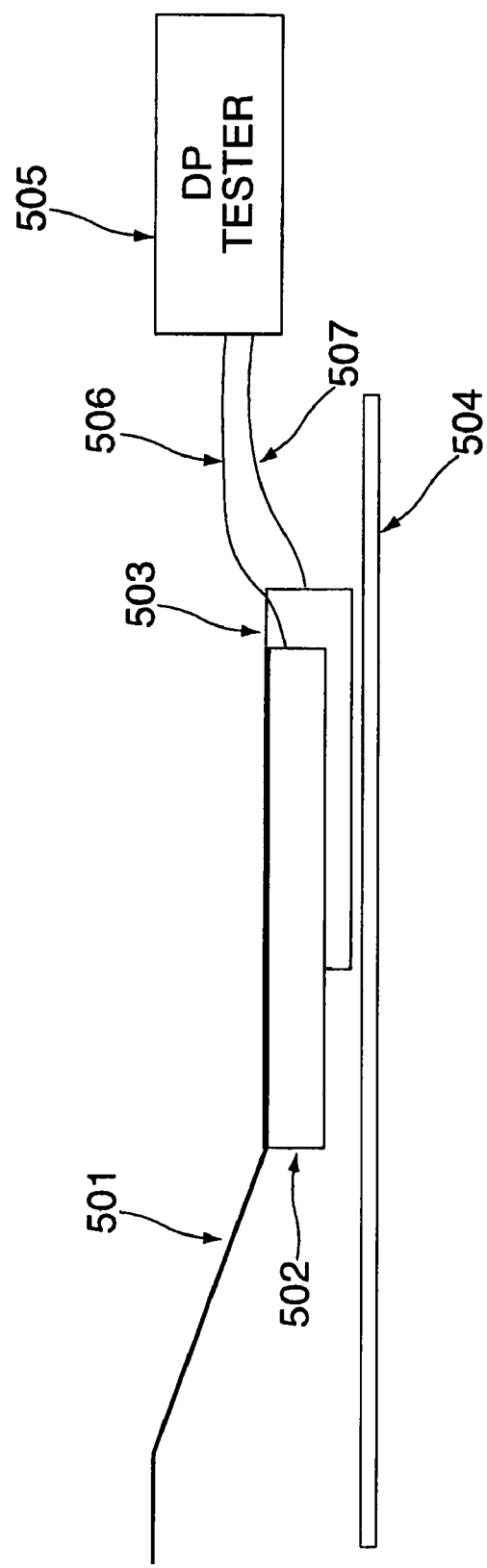
FIG. 5 illustrates one embodiment of the testing system as practiced in the present invention.

FIG. 5 illustrates one embodiment of the testing system as practiced in the present invention. A suspension 501 and a micro-actuator 502 of a head gimbal assembly HGA may suspend a slider 503 above a disk 504 storing data. The HGA may be loaded into a dynamic parameter (DP) tester 505. The DP tester 505 may have a first electrical connection 506 controlling the micro-actuator 502, a second electrical connection 507 controlling the magnetic read/write head of the slider 503, and a mechanism (not shown) controlling the movement of the suspension 501. The mechanism is standard on most DP testers. A typical mechanism for moving the suspension may include of a massive stainless steel platform, on which the suspension is mounted. The platform may be mounted on a piezoelectric stage for precise movement and a motor-driven stage for long-range motion. The DP tester may be used to test the stroke and frequency response of the HGA.

Figure 6:
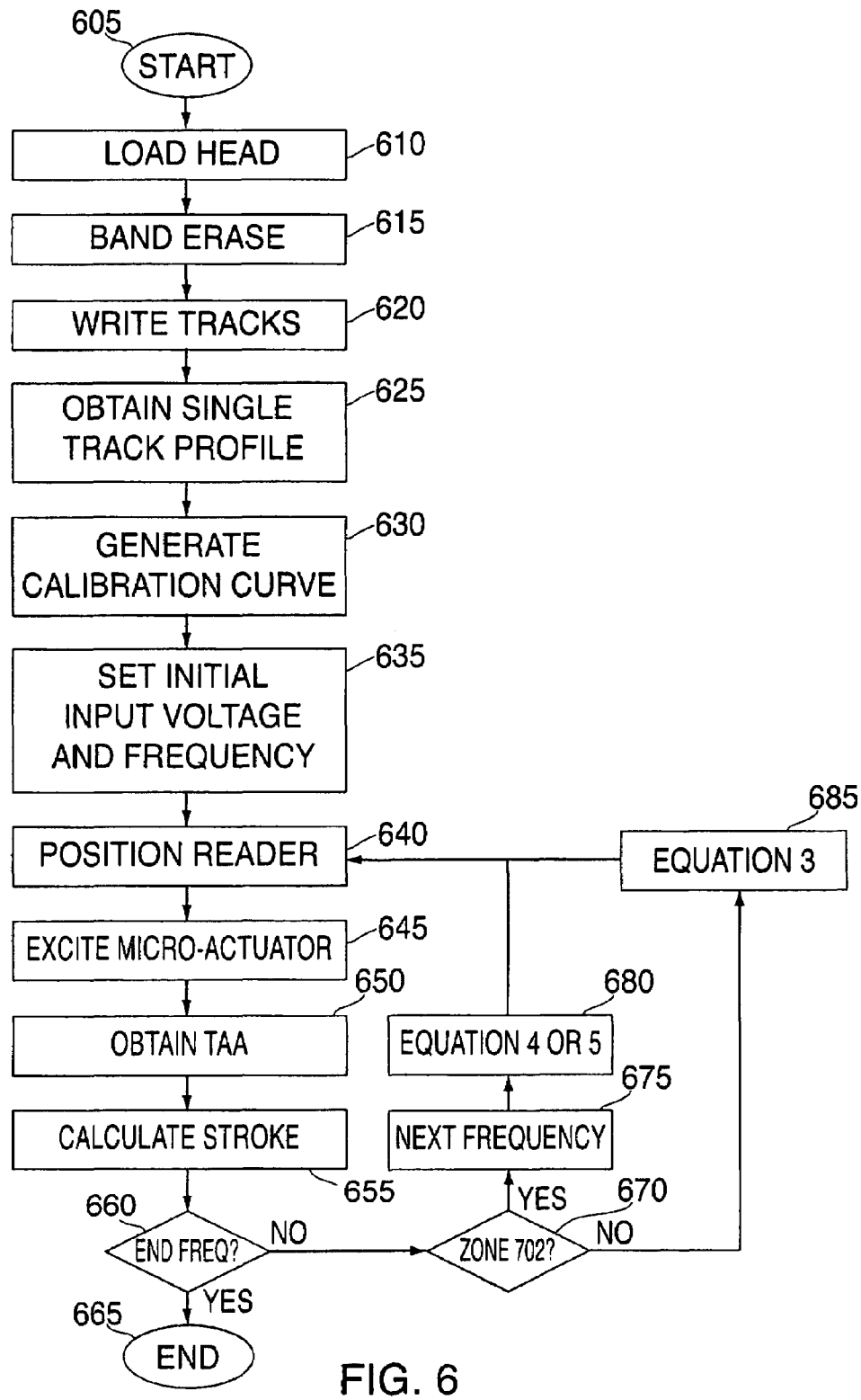
FIG. 6 illustrates in a flowchart one embodiment of a testing method according to the present invention.

FIG. 6 illustrates in a flowchart one embodiment of a testing method. The process starts (Block 605) by loading a HGA with a slider 503 into the DP tester (Block 610). A band of disk 504 area is erased (Block 615). The read/write head writes two or more concentric tracks in the erased band at a predetermined pitch (2δ) (Block 620). The pitch is the distance between two parallel or concentric lines. The writing is performed in the absence of input voltage to the micro-actuator. The pitch is achieved by a moving mechanism of the DP tester 505. A track profile is obtained on any one of the tracks (Block 625). The track profile may be the track-averaged amplitude (TAA) of the read-back signal, as a function of incremental change in track radius (r). The function TAA(r) is referenced to the center of the track. Thus the independent variable (r) typically varies in the range between positive and negative ten micro-inches (±0.25 μm). The tracks will then be read back while the micro-actuator is subject to a variable input voltage (V) with successively increasing or decreasing frequencies (f). The stroke (s) at each test condition, as defined by a pair of input parameters such as frequency and voltage and measured base to peak, is derived from the average amplitude of the read-back signal.

Assuming that the micro-actuator moves sinusoidally under the input voltage, the neutral position of the micro-actuator coincides with the center of the two concentric tracks. Since the test of frequency response consists of multiple test conditions, each condition may be identified by an index number i. Thus the input frequency and voltage may be as denoted f(i) and V(i) and the corresponding stroke and time-averaged read-back signal amplitude as S(i) and TAA(i), with their relationship described by Equation 1 below:

$$TAA(i) = \frac{2}{\pi} \int_{-\delta}^{S-\delta} \frac{TAA(r)}{\sqrt{[S(i)]^2 - (r+\delta)^2}} \cdot dr. \qquad (1)$$

Figure 7:
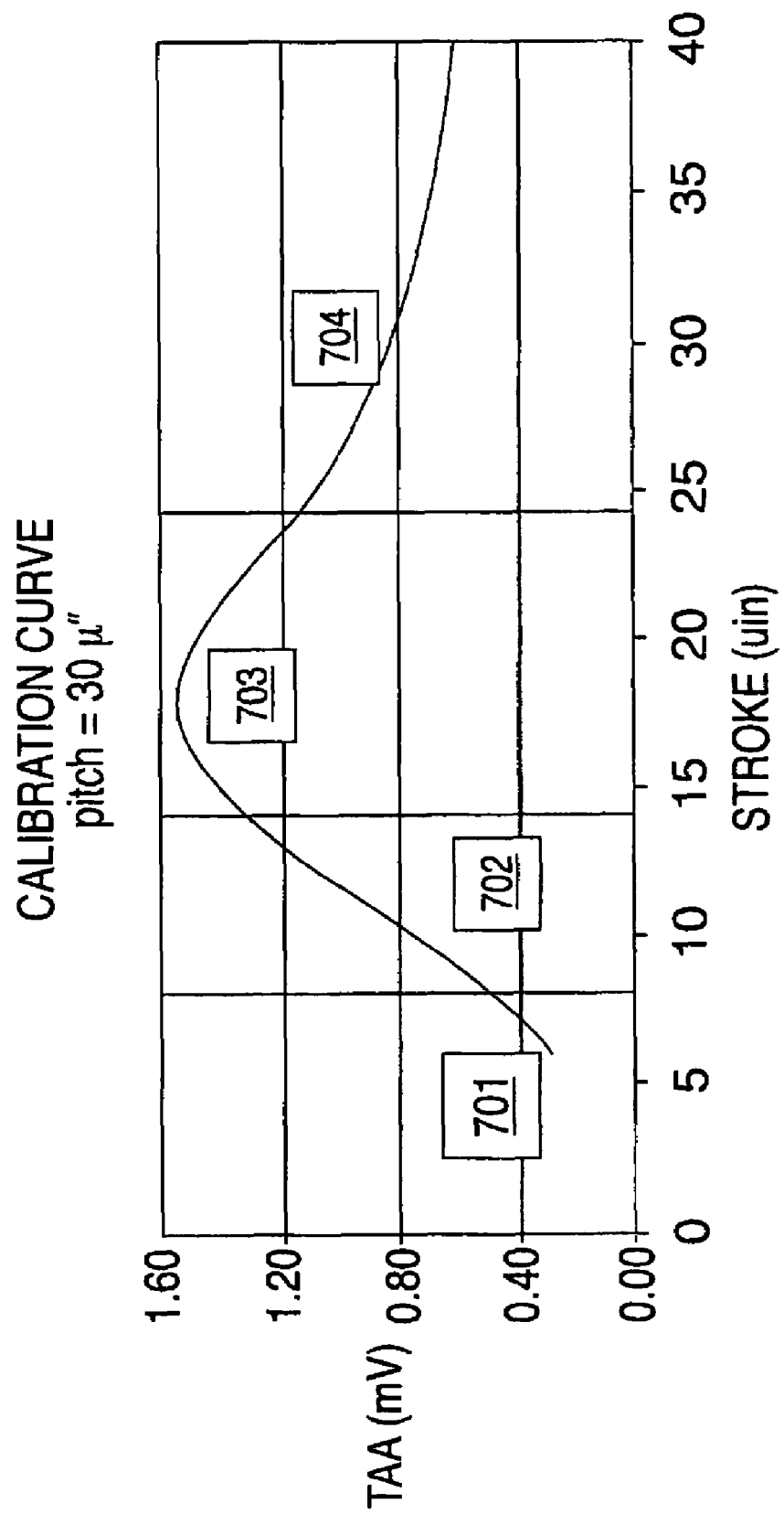
FIG. 7 illustrates an example of a calibration curve generated according to the present invention.

A calibration curve of TAA(i) vs. S(i) may be generated using Equation 1 (Block 630). FIG. 7 illustrates an example of a calibration curve. The calibration curve in this example compares the TAA in millivolts to the stroke in micro-inches at a pitch of 30 micro-inches.

Both required parameters TAA(r) and TAA(i) are sequences of the read-back signal amplitude and may be readily accessible on any standard DP tester 505. TAA(r) is generated in a standard track-profile measurement, without exciting the micro-actuator 502. TAA(r) is used to generate a calibration curve TAA(i) vs. S(i). TAA(i) is by definition time-averaged read-back signal amplitude while the micro-actuator 502 is being excited. As long as the excitations lasts at least one revolution of disk 504, TAA(i) is equivalent to the track-average of read-back signal amplitude, which is available in any standard DP tester 504. Therefore the main modification of the DP tester is providing a means to excite the micro-actuator, such as adding the second electrical connection 506 shown in FIG. 5.

The calibration curve may be divided qualitatively into four zones. Zone 701 may be associated with a very small stroke. The read-head has usually either not yet reached either of the two tracks, or just barely reached the inner edges of the two tracks. Further, the read-back signal may be too weak compared with the background noise. Therefore, zone 701 is usually not suitable for performing the stroke measurement. Zone 702 may be associated with a moderate stroke. The read-head in this zone may travel well into both tracks, but not beyond. The read-back signal may be strong compared with the background noise, and the slope of the calibration curve may be steep. Because of this, zone 702 may be most suitable for the stroke measurement. Zone 703 may be associated with stroke approximately half of the track pitch. The read-head may travel near the outer edges of the tracks, producing a strong read-back signal. However the calibration curve may be flat. The resolution of the stroke may be poorer than in Zone 702. Additionally, the value of the stroke may be ambiguous, because the curve is not monotonic. Zone 704 may be associated with a stroke much greater than half of the track pitch. Slope of the calibration curve may be lower than in Zone 702. In general, Zone 704 may be the second most desirable operating range.

The quality of the calibration curve is important. The test may be more robust when Zone 702 is wider. However the stroke is usually larger during the test, which results in greater wear and tear of the micro-actuator. The test may be most accurate when Zone 2 is narrower and the peak of calibration curve is higher. The pitch between the two concentric written tracks may manipulate the shape of calibration curve. The peak of the calibration curve usually occurs when the peak-to-peak stroke is approximately equal to the track pitch. The peak is usually highest when the tracks are nearly adjacent to each other. The user may compare several tentative test conditions by running some numerical simulations, using a typical track-profile, and varying the pitch using Equation 1.

If V(i) is held constant as f(i) varies, S(i) may span over all four zones. To remain in Zone 702, V(i) may be adjusted following the method shown in FIG. 6. Zone 702 on the calibration curve is defined, and an "ideal stroke" $S_{ideal}$ in Zone 702 is selected. Based on statistics of prior experiences, an initial voltage V(1) and frequency f(1) are set (Block 635). The magnetic read/write head is positioned between the two concentric tracks (Block 640). The magnetic read/write head takes a reading while the DP tester 505 excites the micro-actuator 502 (Block 645). The TAA(1) is obtained (Block 650) and the initial stroke S(1) is calculated (Block 655). If the final frequency is being used (Block 660), the process is finished (Block 665). If the frequency is not the final frequency (Block 660), the S(1) is compared to the calibration curve. If S(1) is in Zone 702 (Block 670), the measurement is acceptable. No retry is needed. However if S(1) is outside of Zone 702, V(1) will be adjusted to bring S(1) closer to the "ideal stroke". Assuming that the gain G(i), defined in equation 2 as $$G(i)=S(i)/V(i), \qquad (2)$$

is independent of the input voltage, V(1) and S(1) may be proportional to each other, as shown in Equation 3:

$$V(i)_{new}=V(i)_{old} \times S_{ideal}/S(i)_{old}. \qquad (3)$$

Conceptually V(1) may be adjusted more than once. V(1) is adjusted according to Equation 3 until S(1) is within Zone 702 (Block 685). The iteration stops when S(1) is within Zone 702. Due to excellent linearity of the micro-actuator, no more than one adjustment may be needed in practice.

For subsequent f(i), as i is incremented (Block 675), the default input voltage may be calculated by assuming that the gain does not vary significantly with frequency. Then V(i+1) is calculated in the same way as the retry of V(i), as shown in Equation 4:

$$V(i+1)=V(i) \times S_{ideal}/S(i). \qquad (4)$$

Equation 4 may have a "phase-lag", because the gain does vary with frequency. However Zone 702 is relatively wide compared with error associated with the changing gain. Thus Equation 4 is usually adequate in practice. Adjustment of input voltage at any given frequency by equation (3) is rarely required.

A correction factor may be incorporated in Equation 4, which relies on typical frequency response to predict the gain change from f(i) to f(i+1). This correction factor may not be necessary in most applications. A version of Equation 4 is shown in Equation 5:

$$V(i+1)=V(i) \times [S_{ideal}/S(i)] \times [Gain(i)/Gain(i+1)]. \qquad (5)$$

Equation 4 or 5 may be used as necessary to predict the gain for the next frequency used (Block 680). The objective is to control V(i) to keep the stroke within Zone 702 while the frequency of excitation sweeps stepwise over a predetermined range.

Figure 8A:
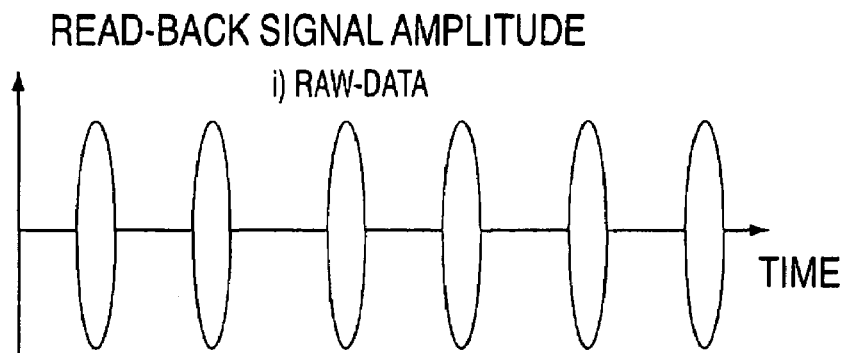
FIGS. 8a–c illustrate examples of the feedback signals generated according to the present invention.
Figure 8B:
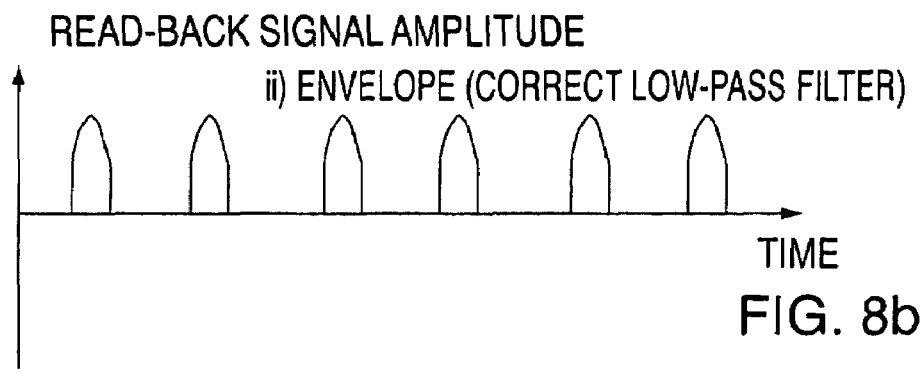
Figure 8C:
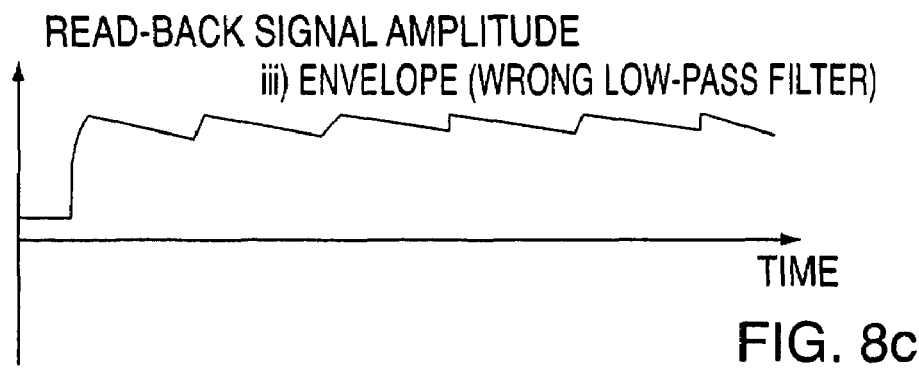

When measuring TAA(i) on a DP tester 505, the corner frequency of a low-pass filter may be at least several times greater than the frequency of micro-actuator excitation. This prevents the envelope of the read-back signal from being artificially flatten and the "average" amplitude TAA(i) from being exaggerated. The raw feed is shown in FIG. 8a. FIG. 8b illustrates an envelope of the read-back signal with the correct low-pass filter and FIG. 8c illustrates an envelope of the read-back signal with an incorrect low-pass filter.

Figure 9:
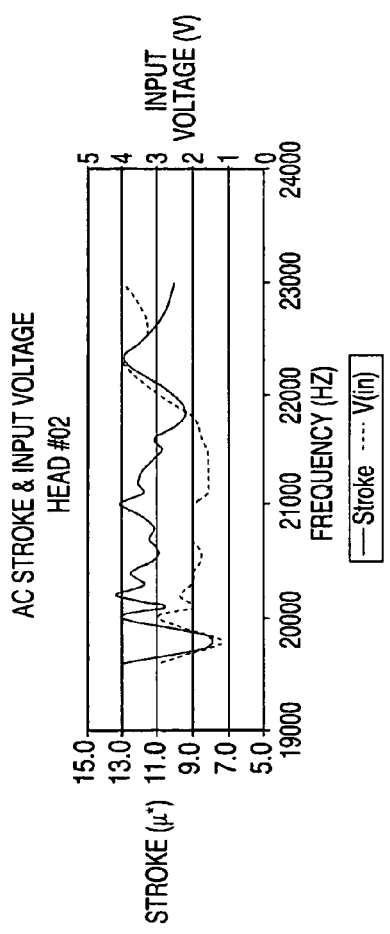
FIG. 9 illustrates in a graph one profile of stroke compared with frequency.
Figure 10:
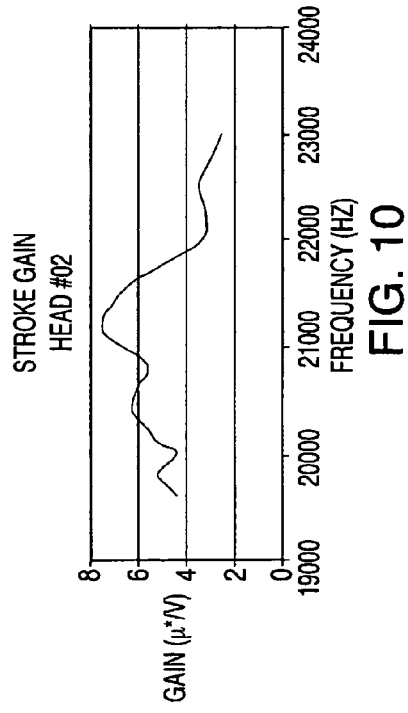
FIG. 10 illustrates in a graph a profile of gain compared with frequency.

If Equation 3 was invoked during measurement, in other words if the micro-actuator was excited by more than one input voltage at the same frequency f(i), only the final value of input voltage and final value of time-averaged read-back signal amplitude are retained as V(i) and TAA(i). Measurements outside of Zone 2 may be discarded. For each head, one calibration curve is valid in all frequencies. At each frequency f(i), one V(i) and one TAA(i) are used as raw-data. Using the calibration curve, TAA(i) yields a stroke S(i). FIG. 9 illustrates one profile of stroke in μinches compared with frequency in Hz. By Equation 2, S(i) and V(i) yield a gain G(i). FIG. 10 illustrates a profile of gain in μinches/Volt compared with frequency in Hz.

Although several embodiments are specifically illustrated and described herein, it will be appreciated that modifications and variations of the present invention are covered by the above teachings and within the purview of the appended claims without departing from the spirit and intended scope of the invention.

The invention claimed is:

1. A testing method, comprising:
   writing two concentric tracks on a noise free portion of a magnetic storage medium;
   positioning a magnetic read/write head and a micro-actuator between the two concentric tracks;
   applying a first oscillating voltage at a first frequency to the micro-actuator while reading back a first signal from the two concentric tracks; and
   calculating a first stroke characteristic of the micro-actuator based in part on the first signal.

2. The testing method of claim 1, wherein the noise free portion of the data storage medium is created by erasing a portion of the data storage medium.

3. The testing method of claim 1, further comprising determining the first oscillating voltage from previous tests.

4. The testing method of claim 1, wherein the first stroke characteristic of the micro-actuator is based on a time-averaged amplitude of the first signal.

5. The testing method of claim 4, further comprising writing the two concentric tracks at a pre-determined pitch.

6. The testing method of claim 5, further comprising generating a calibration curve based on a relation between the pitch ($2\delta$), the time-averaged amplitude (TAA), a track radius (r), and the first stoke characteristic (S) represented by:

$$TAA(i) = \frac{2}{\pi} \int_{-\delta}^{S-\delta} \frac{TAA(r)}{\sqrt{[S(i)]^2 - (r+\delta)^2}} \cdot dr.$$

7. The testing method of claim 1, further comprising:
   applying a second oscillating voltage at a second frequency to the micro-actuator while reading back a second signal from the two concentric tracks; and
   calculating a second stroke characteristic of the micro-actuator based in part on the second signal.

8. The testing method of claim 7, further comprising calculating the second voltage by multiplying the first voltage by the first stroke characteristic divided by an ideal stroke characteristic.

9. The testing method of claim 8, further comprising using a typical frequency response to predict a gain change between the first frequency and the second frequency.

10. A testing system, comprising:
    a magnetic storage medium to store data;
    a magnetic read/write head to write two concentric tracks on a noise free portion of the magnetic storage medium;
    a head gimbal assembly to position the magnetic read/write head and a micro-actuator between the two concentric tracks; and
    a tester to apply a first oscillating voltage at a first frequency to the micro-actuator while reading back a first signal from the two concentric tracks.

11. The testing system of claim 10, wherein a first stroke characteristic of the micro-actuator is based on a time-averaged amplitude of the first signal.

12. The testing system of claim 11, wherein the tester applies a second oscillating voltage at a second frequency to the micro-actuator while reading back a second signal from the two concentric tracks.

13. The testing system of claim 12, wherein the second oscillating voltage is calculated by multiplying the first oscillating voltage by the first stroke characteristic divided by an ideal stroke characteristic.

14. The testing system of claim 12, wherein a typical frequency response is used to predict a gain change between the first frequency and the second frequency.

15. A set of instructions residing in a computer readable storage medium, said set of instructions to be executed by a processor to implement a method for processing data, the method comprising:
    writing two concentric tracks on a noise free portion of a magnetic storage medium;
    positioning a magnetic read/write head and a micro-actuator between the two concentric tracks;
    applying a first oscillating voltage at a first frequency to the micro-actuator while reading back a first signal from the two concentric tracks; and
    calculating a first stroke characteristic of the micro-actuator based in part on the first signal.

16. The set of instructions of claim 15, further comprising determining the first oscillating voltage from previous tests.

17. The set of instructions of claim 15, wherein the first stroke characteristic of the micro-actuator is based on a time-averaged amplitude of the first signal.

18. The set of instructions of claim 17, further comprising writing the two concentric tracks at a pre-determined pitch.

19. The set of instructions of claim 18, further comprising generating a calibration curve based on a relation between the pitch ($2\delta$), the time-averaged amplitude (TAA), a track radius (r), and the first stroke characteristic (S) represented by:

$$TAA(i) = \frac{2}{\pi} \int_{-\delta}^{S-\delta} \frac{TAA(r)}{\sqrt{[S(i)]^2 - (r+\delta)^2}} \cdot dr.$$

20. The set of instructions of claim 15, further comprising:
    applying a second oscillating voltage at a second frequency to the micro-actuator while reading back a second signal from the two concentric tracks; and
    calculating a second stroke characteristic of the micro-actuator based in part on the second signal.

21. The set of instructions of claim 20, further comprising calculating the second voltage by multiplying the first voltage by the first stroke characteristic divided by an ideal stroke characteristic.

22. The set of instructions of claim 20, further comprising using a typical frequency response to predict a gain change between the first frequency and the second frequency.

* * * * *